United States Patent
Aoki (10) Patent No.: US 8,041,274 B2
(45) Date of Patent: Oct. 18, 2011

(54) IMAGE FORMING SYSTEM

(75) Inventor: Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 476 days.

(21) Appl. No.: 12/359,562

(22) Filed: Jan. 26, 2009

(65) Prior Publication Data

US 2009/0190149 A1 Jul. 30, 2009

(30) Foreign Application Priority Data

Jan. 29, 2008 (JP) ................................. 2008-018154

(51) Int. Cl.
- G03G 15/01 (2006.01)
- G03G 15/00 (2006.01)
- G06K 15/00 (2006.01)

(52) U.S. Cl. ............ 399/301; 399/14; 399/394; 358/1.2
(58) Field of Classification Search .................... 399/14, 399/301, 394
See application file for complete search history.

(56) References Cited

U.S. PATENT DOCUMENTS

| | | | | |
|---|---|---|---|---|
| 5,270,769 | A * | 12/1993 | Satoh et al. | 399/301 |
| 5,828,400 | A * | 10/1998 | Fleming | 347/238 |
| 5,973,718 | A * | 10/1999 | Charnitski et al. | 347/242 |
| 6,118,463 | A * | 9/2000 | Houki et al. | 347/116 |
| 2002/0043164 | A1* | 4/2002 | Kajiwara et al. | 101/171 |
| 2003/0063917 | A1* | 4/2003 | Shinohara | 399/49 |
| 2004/0017576 | A1* | 1/2004 | Nakagawa et al. | 358/1.2 |
| 2006/0181753 | A1 | 8/2006 | Kawai | |
| 2006/0188298 | A1* | 8/2006 | Aikawa | 399/301 |
| 2006/0285139 | A1* | 12/2006 | Baunach et al. | 358/1.12 |
| 2006/0285162 | A1 | 12/2006 | Honma | |
| 2007/0196132 | A1* | 8/2007 | Kobayashi et al. | 399/167 |
| 2008/0291497 | A1* | 11/2008 | Kuwano et al. | 358/1.18 |

FOREIGN PATENT DOCUMENTS

| | | |
|---|---|---|
| JP | 08-181871 | 7/1996 |
| JP | 09-090698 | 4/1997 |
| JP | 11-194573 | 7/1999 |
| JP | 2002-333744 A | 11/2002 |
| JP | 2004-133217 | 4/2004 |
| JP | 2006-084565 A | 3/2006 |
| JP | 2006-227595 A | 8/2006 |
| JP | 2006-350088 A | 12/2006 |
| JP | 2007-110325 A | 4/2007 |

OTHER PUBLICATIONS

JP Office Action dtd Apr. 15, 2010, JP Appln. 2008-018154, English translation.
JP Office Action dtd Dec. 8, 2009, JP Appln. 2008-018154.

* cited by examiner

*Primary Examiner* — Twyler Haskins
*Assistant Examiner* — Helen Q Zong
(74) *Attorney, Agent, or Firm* — Banner & Witcoff, Ltd (57) ABSTRACT

An image forming system, according to the present invention can include a forming device for forming an image based on printing data, an obtaining device for obtaining an image-formable range specific to the forming device, a determination circuit for determinating if the image based on printing data fits within the image-formable range, and an adjusting circuit for adjusting at least one of a position and a size of the image in accordance with the image-formable range, when the determination circuit determines that the image does not fit within the image-formable range.

20 Claims, 10 Drawing Sheets

IMAGE FORMING SYSTEM

CROSS REFERENCE TO RELATED APPLICATIONS

This application claims priority from Japanese Patent Application No. 2008-018154 filed Jan. 29, 2008. The entire content of this priority application is incorporated herein by reference.

TECHNICAL FIELD

The present disclosure relates to an image forming system.

BACKGROUND

In general, an image-formable range for a recording medium (such as paper sheet and plastic sheet) in an image forming apparatus is defined in a specification in accordance with the size of the recording medium. The image forming apparatus also has a range mechanically capable of image formation, other than the image-formable range defined in a specification. Particularly, the structural image-formable range in a main scanning direction is decided according to, for example, a scanning range of a laser for an electrophotographic laser printer and a scanning range of an inkjet head for an inkjet printer. An image-formable range defined in a specification is generally the same among products of the same kind, while a structural image-formable range varies for each product due to such as displacement of assembling positions of parts even among products of the same kind. The structural image-formable range is typically designed so as to be larger than a maximum image-formable range defined in a specification, since an image loss occurs in the image formed on a recording medium when this structural image-formable range does not include the maximum image-formable range defined in a specification.

However, designing an apparatus so that the structural image-formable range becomes sufficiently larger than the maximum image-formable range defined in a specification causes enlargement of parts as well as cost increase. On the contrary, when the structural image-formable range is made smaller, the possibility of generating image loss increases as mentioned above. In order to counter the generation of image loss, a strategy such as conducting the part assembly process in high accuracy needs to be prepared, resulting in a cost increase.

SUMMARY

An image forming system, according to the present invention can include a forming device for forming an image based on printing data, an obtaining device for obtaining an image-formable range specific to the forming device, a determination circuit for determinating if the image based on printing data fits within the image-formable range, and an adjusting circuit for adjusting at least one of a position and a size of the image in accordance with the image-formable range, when the determination circuit determines that the image does not fit within the image-formable range.

BRIEF DESCRIPTION OF THE DRAWINGS

Illustrative aspects in accordance with the invention will be described in detail with reference to the following figures wherein.

DETAILED DESCRIPTION

An aspect of the present invention will be described with reference to FIGS. 1 to 10.

1. Entire Configuration of Printer

Figure 1:
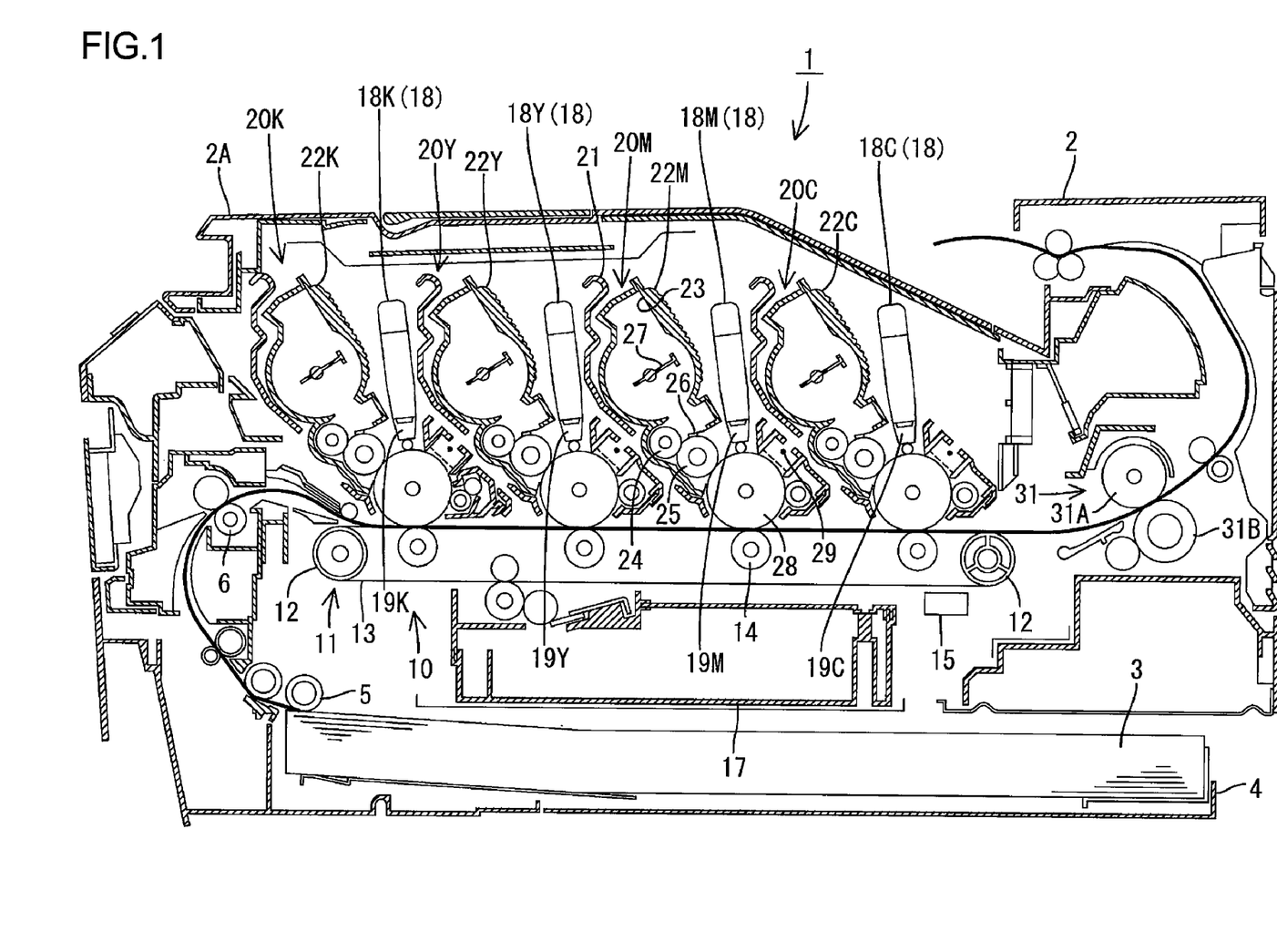
FIG. 1 is a sectional side view showing a general structure of a printer composing an image forming system in one aspect of the present invention.

FIG. 1 is a sectional side view showing a general structure of a printer 1 as one example of an image forming apparatus composing an image forming system of the present invention. Additionally, in the following description, the left side of FIG. 1 shows the front. In addition, the printer 1 can be a color printer which forms a color image of toner of, for example, various colors (black K, yellow Y, magenta M, and cyan C). In what follows, when each component is distinguished by each color, K (black), Y (yellow), M (magenta), and C (cyan) are respectively allotted to the end of numerals of the components.

The printer 1 comprises a body casing 2, and, on the upper surface thereof, a cover 2A which is openable and closeable is provided. On the bottom of the body casing 2, a feed tray 4 on which a recording medium 3 (which can include, for example, paper sheet, plastic sheet, and the like) is stacked is provided. Above the front end of the feed tray 4, there is provided a feed roller 5 to deliver, along the rotation thereof, the recording medium 3 stacked on the uppermost in the feed tray 4 to a registration roller 6. After conducting skew correction of the recording medium 3, the registration roller 6 then delivers the recording medium 3 onto a belt unit 11 in a image forming mechanism 10.

The image forming mechanism 10 comprises such as the belt unit 11, an exposure unit 18, a processing unit 20, and a fixing unit 31.

The belt unit 11 is configured, with a loop belt 13 (one example of a supporting member) that can be made of polycarbonate extended between a pair of belt supporting rollers 12. And with the rotational drive of the rear belt supporting roller 12, the belt 13 moves in the clockwise direction in the present figure, so that the recording medium 3 on the upper surface of the belt 13 is delivered to the rear side. And also, inside of the belt 13, there is provided a transfer roller 14 in a position opposed to each photoreceptor drum 28 in the later-described processing unit 20, with the belt 13 in between.

Furthermore, a pattern detection sensor 15 (one example of an obtaining device) for detecting a pattern formed on the belt 13 is provided in a position opposed to the bottom surface of the belt 13. The pattern detection sensor 15 is configured by, for example, aligning a plurality of photo diodes in a direction orthogonal to the delivering direction of the belt 13. The pattern detection sensor 15 receives a light, which is emitted from a light source and reflected on the belt 13, on each photo diode, and outputs an electrical signal corresponding to the intensity of the received light. Also, on the lower side of the belt unit 11, there is provided a cleaning device 17 for collecting debris (such as toner and paper chips) adhered to the surface of the belt 13.

The exposure unit 18 comprises LED units 18K, 18Y, 18M, and 18C (one example of an exposing device) corresponding to each of the previously described colors (black, yellow, magenta, and cyan). Each LED unit 18K, 18Y, 18M, and 18C is supported on the bottom surface of the cover 2A by a supporting means (not shown), and respectively has LED heads 19K, 19Y, 19M, and 19C on the lower end thereof. LED heads 19K, 19Y, 19M, and 19C can include a plurality of light emitting elements composed of LEDs and aligned in a line in a horizontal direction. The light emission of each light emitting element is controlled based on image data to be formed, and the light emitted from each light emitting element irradiates the surface of a photoreceptor drum 28, thereby exposing the surface.

The processing unit 20 comprises process cartridges 20K, 20Y, 20M, and 20C respectively corresponding to the above colors. Each process cartridge 20K, 20Y, 20M, and 20C comprises a cartridge frame 21 and a developing cartridge 22K, 22Y, 22M, and 22C removably attached to the cartridge frame 21. When the cover 2A is released, each LED unit 18K, 18Y, 18M, and 18C moves along with the cover 2A, and thus each process cartridge 20K, 20Y, 20M, and 20C becomes removable from the body casing 2. Additionally, in the present aspect of the invention, the above-mentioned LED units 18K, 18Y, 18M, and 18C, the process cartridges 20K, 20Y, 20M and 20C, and each transfer roller 14 constitute four sets of forming device.

Each developing cartridge 22K, 22Y, 22M, and 22C comprises a toner storing chamber 23 for storing toner of each color as a developer, and at the lower side thereof, can include a feed roller 24, a developing roller 25, a thickness regulating blade 26, and an agitator 27. The toner discharged from the toner storing chamber 23 is then fed to the developing roller 25 due to the rotation of the feed roller 24, and is positively and triboelectrically-charged between the feed roller 24 and the developing roller 25. Furthermore, the toner fed onto the developing roller 25 then, along with the rotation of the developing roller 25, moves in the gap between the thickness regulating blade 26 and the developing roller 25 to be sufficiently and triboelectrically-charged there, thereby being held on the developing roller 25 as a thin-layer having a constant thickness.

In the lower part of the cartridge frame 21, there are provided a photoreceptor drum 28 (one example of a photoreceptor), with its surface covered by a photosensitive layer of a positive charge type, and a charger 29 (i.e. scorotron type). At the time of image formation, the photoreceptor drum 28 is rotationally driven, so that the surface thereof is uniformly and positively charged by the charger 29. And then, the positively-charged part is exposed by the high-speed scanning of the laser emitted from the exposure unit 18, and an electrostatic latent image corresponding to the image ought to be formed on the recording medium 3 is formed on the surface of the photoreceptor drum 28.

Next, with the rotation of the developing roller 25, the positively-charged toner that is supported on the developing roller 25 is supplied to the electrostatic latent image being formed on the surface of the photoreceptor drum 28 when it comes to a position opposed to and in contact with the photoreceptor drum 28. This enables visualization of the electrostatic latent image on the photoreceptor drum 28, and supports a toner image on the surface of the photoreceptor drum 28, with the toner adhered only to the exposed part.

After that, while the recording medium delivered on the belt 13 is passing through each of the transfer positions in between the photoreceptor drum 28 and the transfer roller 14, the toner image supported on the surface of each of the photoreceptor drums 28 is sequentially transferred to the recording medium 3 by means of the negative transfer voltage applied to the transfer roller 14. The recording medium 3, with the toner image thus transferred thereon, is then delivered to the fixing unit 31.

The fixing unit 31 can include a heating roller 31A having a heat source, and a pressing roller 31B for pressing the recording medium 3 toward the side of the heating roller 31A, and heat-fixes the toner image that has been transferred onto the recording medium 3 to the paper surface. The recording medium 3 (heat-fixed by the fixing unit 31) is then delivered toward the upper side, and discharged onto the upper surface of the cover 2A.

2. Electrical Configuration

Figure 2:
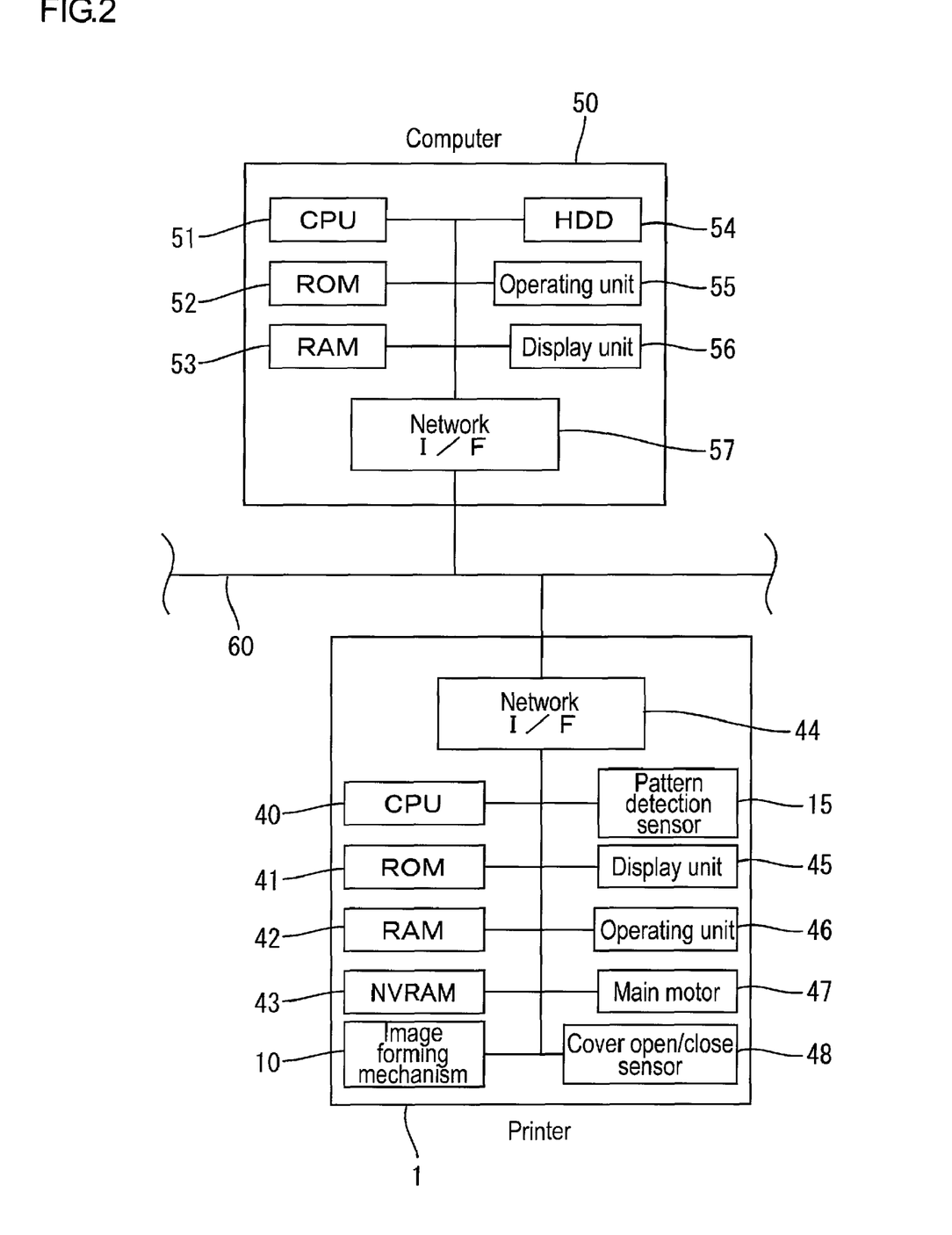
FIG. 2 is a block diagram showing an electrical configuration of a printer and a computer.

FIG. 2 is a block diagram showing an electrical configuration of the printer 1 and a computer 50 which is connected to the printer 1, for example, through a network.

The printer 1, as shown in the present figure, comprises a CPU 40 (one example of a determination circuit and an adjusting circuit), a ROM 41, a RAM 42, a NVRAM (nonvolatile memory) 43, a network interface 44, image forming mechanism 10, the pattern detection sensor 15, a display unit 45 (one example of an informing device), an operating unit 46 (one example of a selecting device), a main motor 47, and a cover open/close sensor 48.

Stored in the ROM 41 are programs for conducting various operations of the printer 1, such as the later-described print and correction control processing. In accordance with these programs read out from the ROM 41, the CPU 40 conducts controls for each unit, while at the same time, recording the processing results into the RAM 42 or the NVRAM 43. The network interface 44 is connected to the external computer 50 via a communication line 60, and this enables the interactive data communication.

The display unit 45 comprises a liquid crystal display and lamps, and is capable of displaying various setting screens and operational states of the apparatus. The operating unit 46 comprises a plurality of buttons which allow the user to perform various inputting operations. The main motor 47 simultaneously rotates (in synch) devices such as the above-mentioned registration roller 6, the belt supporting roller 12, the transfer roller 14, the developing roller 25, the photoreceptor drum 28, and the heating roller 31A. The cover open/close sensor 48 detects an open/close state of the cover 2A and outputs the detected signal.

The computer 50 comprises such as: a CPU 51, a ROM 52, a RAM 53, a hard disk drive 54, an operating unit 55 (one example of a selecting device) composed of a keyboard and a pointing device, a display unit 56 (one example of an informing device) composed of such as a liquid crystal display, and a network interface 57 connected to a communication line 60. Various programs, such as application soft for creating image data for printing and a printer driver are recorded in the hard disk drive 54.

3. Print and Correction Control Processing

Figure 3:
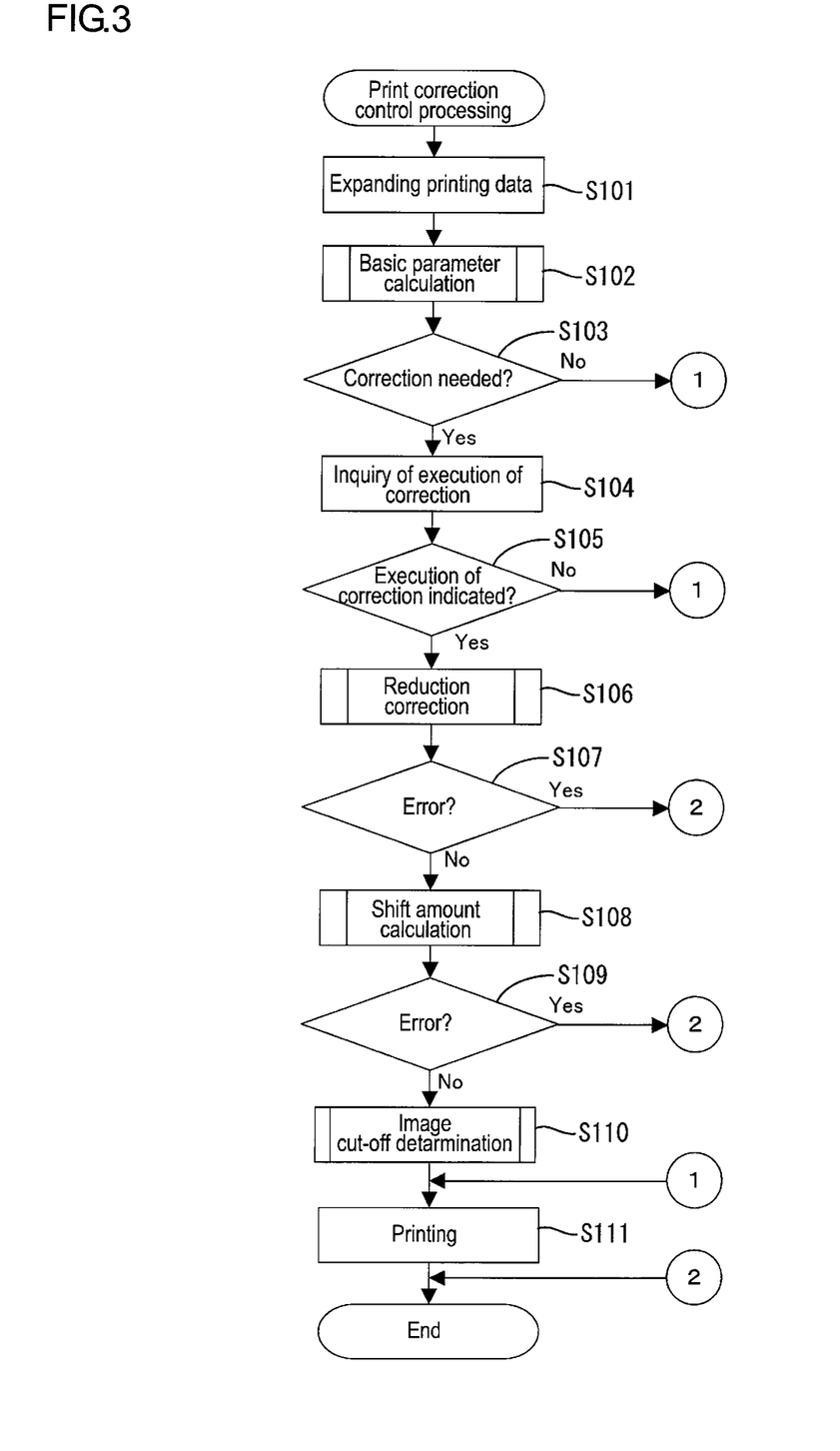
FIG. 3 is a flowchart showing a flow of print and correction control processing.

Next, motion of the print and correction control processing to be executed in the printer 1 is explained. FIG. 3 is a flowchart showing a flow of print and correction control processing.

When the user inputs a printing instruction for image data by using the operating unit 55 in the computer 50, the CPU 51 activates a printer driver and displays a setting screen on the display unit 56. Then, when the user sets various printing conditions through the operating unit 55, the CPU 51 performs processing for reading the image data to be printed and converting it into PDL (page-description language), for example. Then, image data obtained by adding a setting value of printing order (command) and printing condition to the converted data is produced, and the image data is transmitted to the printer 1 through the network interface 57. As a setting item of printing conditions, there are, for example, recording medium size, print quality, printing number of copies, and the later-described designation of text mode, graphic mode, and photo mode.

On receiving printing data (printing order) via the network interface 44, the CPU 40 in the printer 1 starts the print and correction control processing as shown in FIG. 3. As shown in the same figure, the CPU 40 first performs raster expansion of the received printing data (S101), and then executes basic parameter calculation processing as described in below (S102).

Basic Parameter Calculation Processing

Figure 4:
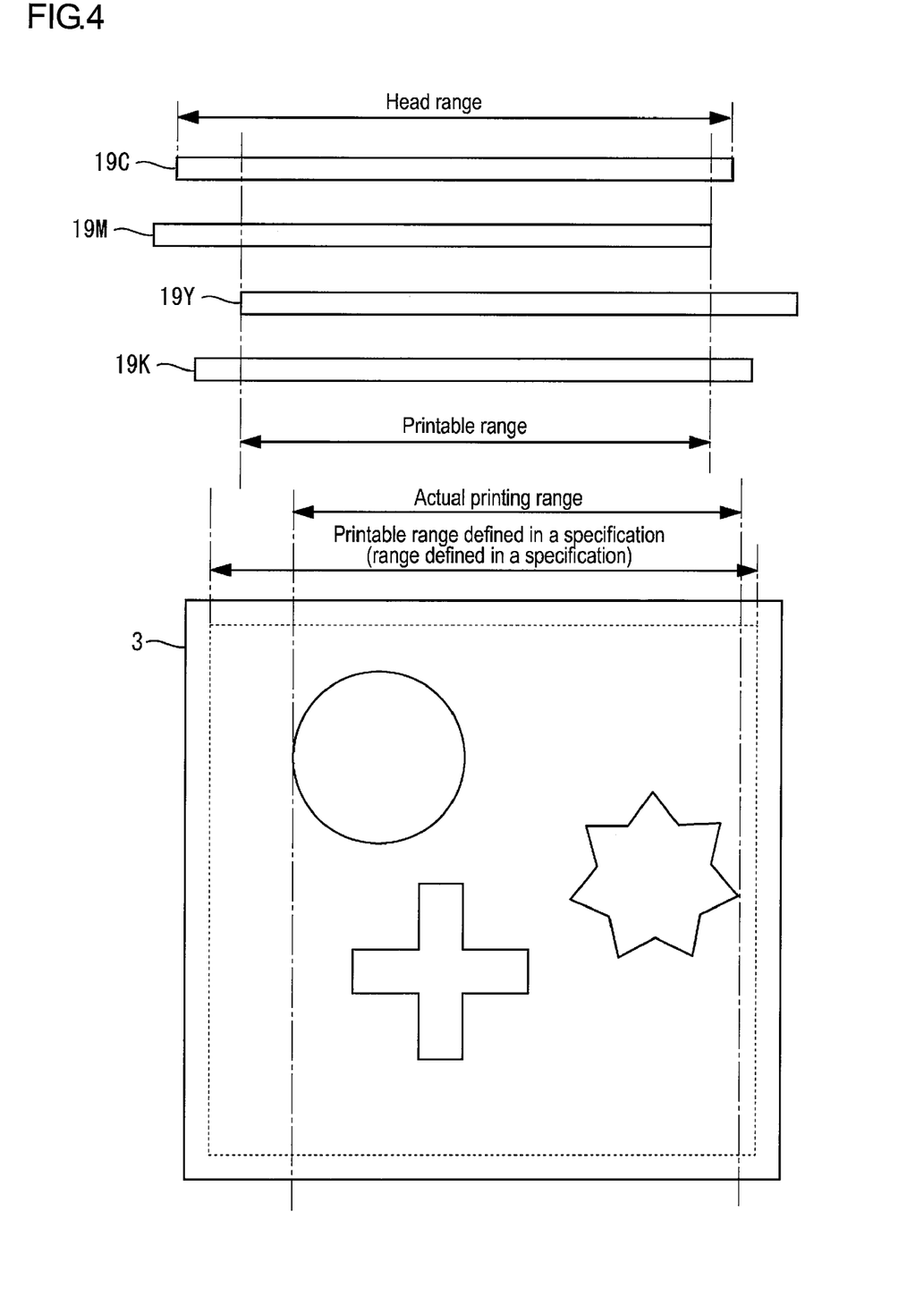
FIG. 4 is a view explaining definitions of terms related to ranges.
Figure 5:
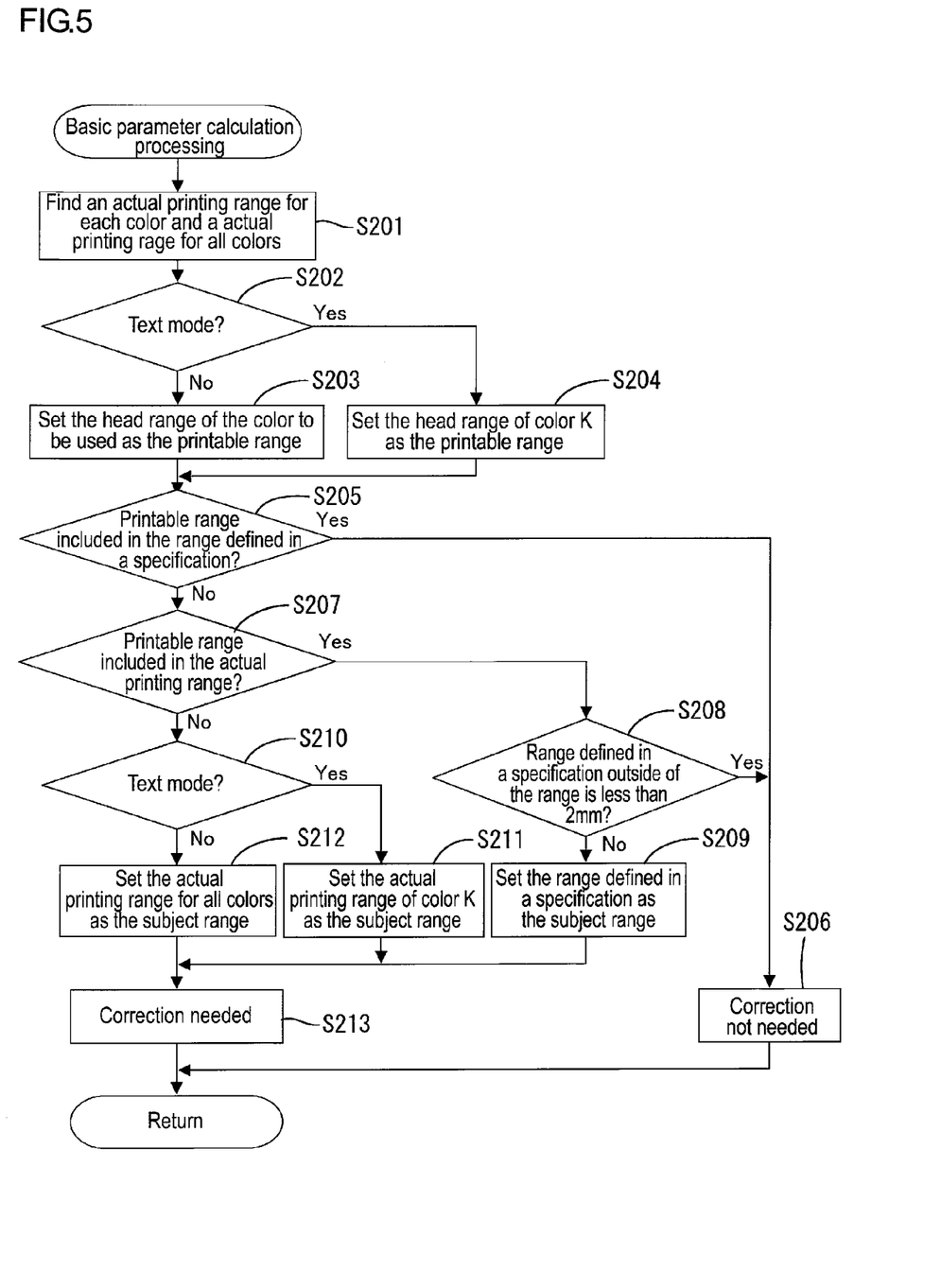
FIG. 5 is a flowchart showing a flow of basic parameter calculation processing.

FIG. 4 is a view explaining definitions of terms related to ranges, and FIG. 5 is a flowchart showing a flow of the basic parameter calculation processing.

The printer 1 prescribes a kind or a plurality of kinds of usable recording medium size, and further, prescribes a printable range defined in a specification (hereinafter referred to as "range defined in a specification") in accordance with the usable recording medium size. In addition, the "range" mentioned in the present aspect of the invention is indicating an area in the main scanning direction (width direction and horizontal direction). The range defined in a specification is, as illustrated in FIG. 4, having a slightly shorter width than the width of the recording medium 3 of a printable size and positioned in the center of the recording medium 3, or is an entire width of the recording medium 3 of a printable size. The pixel for one line of the above-mentioned printing data corresponds to the pixel for one line of the image to be printed in the range defined in a specification.

When starting the basic parameter calculation processing in FIG. 5, the CPU 40 first examines the printing data and finds an actual printing range indicating the actual range subject to printing of each of color of black, yellow, magenta, and cyan, and further finds an actual printing range of all colors. In particular, for example, to find the actual printing range of yellow, the left end position (pixel position in the left end) of the part in which yellow is used in the image of the printing data, as well as the width from the right end position to the left end position of the area in which yellow is used are calculated, and recorded in the RAM 42. Also, to find the actual printing range of all colors, the left end position of the area in which at least one color is used in the image of the printing data, as well as the width from the right end position to the left end position are calculated.

Here, the LED heads 19K, 19Y, 19M, and 19C of each color for writing (exposing) image to the photoreceptor drum 28 has a width slightly wider than the maximum range defined in a specification, and each head range thereof (the range each light emitting element can write on the photoreceptor drum 28) is generally configured so as to include the range defined in a specification. However, as shown in FIG. 4, the position of each LED head 19K to 19C might be deviated in the main scanning direction due to the displacement of assembling position of each part, distortion of the frame, or the posture of the cover 2A at the time of closing the cover.

Figure 6:
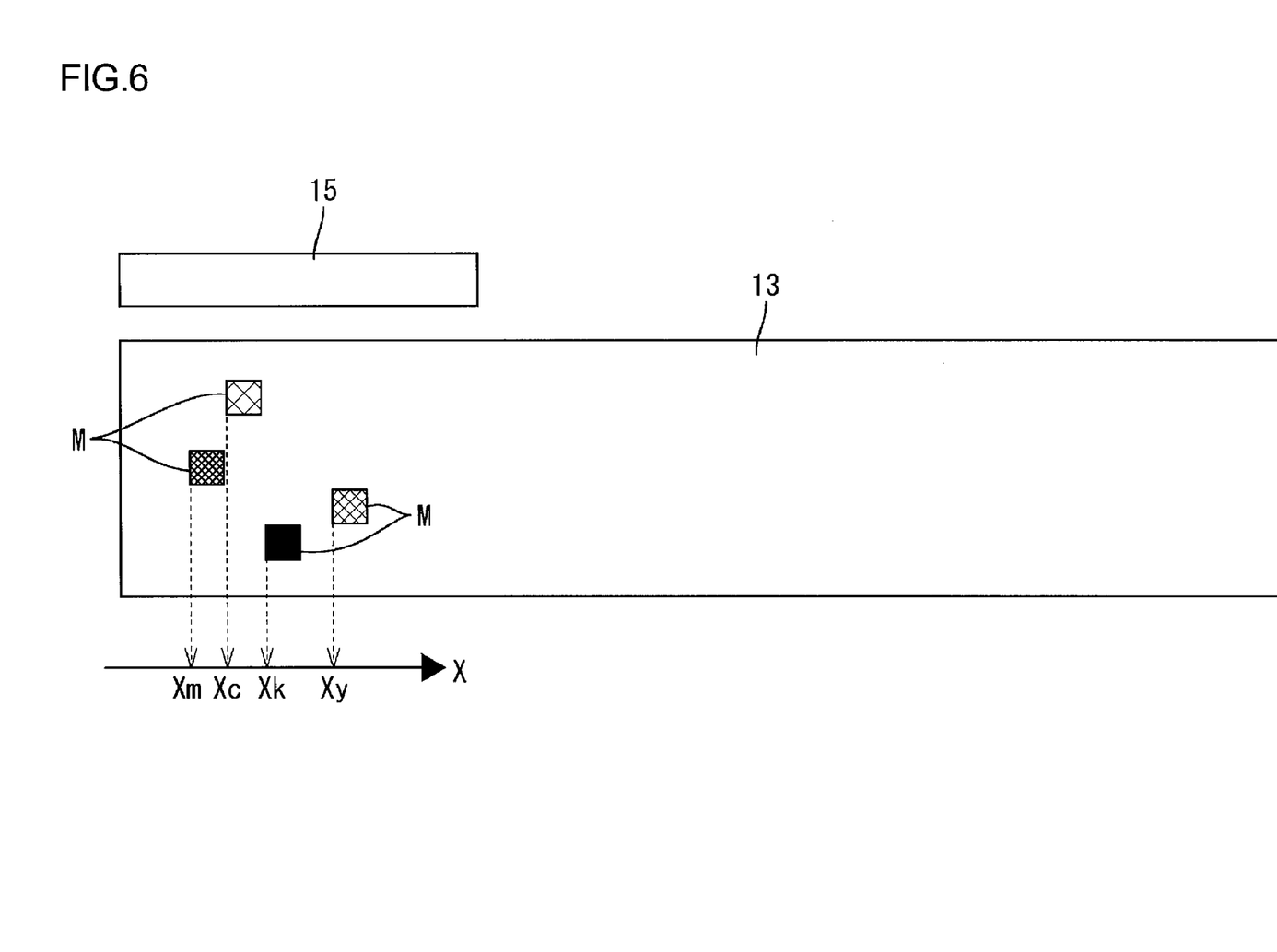
FIG. 6 is a view showing marks to be formed at the time of head position measurement.

There, the CPU 40 performs the position measurement of each LED head 19K to 19C in the following procedure, before executing the print and correction control processing. FIG. 6 is a view showing marks to be formed at the time of head position measurement.

The CPU 40 first exposes the photoreceptor drum 28 by the pixel (light emitting element) positioned in the left end of each LED head 19K to 19C to conduct printing on the surface of the belt 13, so as to form, as illustrated in FIG. 6, a mark M of each color. Then, the mark M of each color is read by the pattern detection sensor 15 to find the position of each mark M in the main scanning direction (X axis direction in FIG. 6), and the value is recorded in the NVRAM 43, for example. In short, the measured left end position (Xk, Xy, Xm, and Xc) of each LED head 19K, 19Y, 19M, and 19C along with the width (constant) of each LED head 19K to 19C can determine the head range.

In addition, this measurement of the head position is performed when, for example, immediately after the power supply, a prescribed time has passed since the previous measurement, or a closure of the cover 2A is detected by the cover open/close sensor 48. Further, a configuration such that the measurement of the head position is conducted by an external equipment at the time of manufacturing the printer 1 may be possible, and the measured value is recorded in the NVRAM 43 so that the recorded data can be read out at the time of obtaining a printable range.

The CPU 40, after finding the actual printing range in S201 in FIG. 5, determines whether or not the text mode is designated in the printing order added to the printing data (S202). When the text mode is not designated (S202: No), the area where the head ranges of each LED head 19K to 19C of the color to be used for printing of the printing data are overlapped is identified as a structural printable range (one example of a "image-formable range specific to forming device", and hereinafter referred to simply as "printable range"), and the left end position and width thereof are recorded in the RAM 42 (S203). In short, this printable range is a range that can be printed by overlapping each color to be used, and obtains a value specific to each LED head 19K to 19C.

For example, when printing is performed by using all the previously described colors, with each LED head 19K to 19C misaligned as shown in FIG. 4, the left end position of the rightmost LED head 19Y becomes the left end position in the printable range, while the right end position of the leftmost LED head 19M becomes the right end position in the printable range. In addition, when the text mode is designated (S202: Yes), the head range of the LED head 19K of black color which is used mainly for characters is set as the printable range (S204).

Next, the CPU 40 determines whether the printable range includes the range defined in a specification (S205). When the printable range includes the range defined in a specification (S205: Yes), since it is understood that image loss does not occur even the original printing data is printed as it is, the later described reduction correction and shift correction is determined to be unnecessary (S206). In particular, the flag value indicating the necessity of correction is turned off, and then the process exits the basic parameter calculation processing.

When the CPU 40 determines that the printable range does not include the range defined in a specification (S205: No), and next, determines whether the printable range includes the actual printing range (S207). Then, when the CPU 40 determines that the printable range includes the actual printing range (S207: Yes), and next, determines whether the width of a range (which is not included in the printable range), in the range defined in a specification is less than 2 mm (S208). When the width of the range (which is not included in the printable range), in the range defined in a specification is less than 2 mm (S208: Yes), then the CPU 40 proceeds to S206 and determines the correction to be unnecessary. In short, when the printable range does not include the range defined in a specification, and when the printing is performed without providing correction to the original printing data, the printing position of the image relative to the recording medium 3 might be displaced from the original position in a width direction, thereby possibly deteriorating the appearance. However, when the width of a range (which is not included in the printable range), in the range defined in a specification is less than 2 mm, the influence from the displacement is understood to be little, and the CPU 40 determines the correction to be unnecessary.

And also, when the width of the range (which is not included in the printable range), in the range defined in a specification is larger than 2 mm (S208: No), the range defined in a specification (the left end position and the width value) is set as a subject range (S209). Here, the subject range means a reference range employed at the time of deciding the reduction rate and the shift amount in the later described reduction correction processing and shift amount calculation processing.

In addition, in S207, when the CPU 40 determines that the printable range does not include the actual printing range (S207: No), then determines whether the text mode is designated in the printing order (S210). And then, when the text mode is designated (S210: Yes), the actual printing range of color K is set as a subject range (S211). And when the text mode is not designated (S210: No), the actual printing range of all colors is set as a subject range (S212). In S206, S211, and S212, after setting the subject range, the correction is determined to be necessary (S213), and the process exits the basic parameter calculation processing.

When the CPU 40 finishes the basic parameter calculation processing in S102 in FIG. 3, and when the correction is determined to be unnecessary (S103: No), the CPU 40 then executes the later described printing processing without conducting the correction (S111).

In particular, for example, the computer 50 (to which the printing data has been transmitted) is informed that the correction is necessary (that image loss may occur, or that displacement in the image position may occur), and at the same time, receives a message to determine a choice whether or not to execute the correction via the network interface 44. In response to receiving the message, the CPU 51 in the computer 50 displays the contents of the message on the display unit 56. Then, when the user inputs an instruction whether to execute the correction via the operating unit 55, a signal corresponding to the instruction is transmitted to the printer 1 via the network interface 57.

The CPU 40 in the printer 1, after the above transmission of the messaging signal, waits for the answer from the computer 50, and after receiving the instruction for not executing the correction (S105: No), proceeds to S111 to conduct the printing processing without the correction. Additionally, in the above inquiring process of execution of the correction, the contents of the message may be displayed on the display unit 45 in the printer 1, and the instruction whether or not to execute the correction may be input from the operating unit 46 in the printer 1. When the instruction to execute the correction is received (S105: Yes), the reduction correction processing below is conducted (S106).

Reduction Correction Processing

Figure 7:
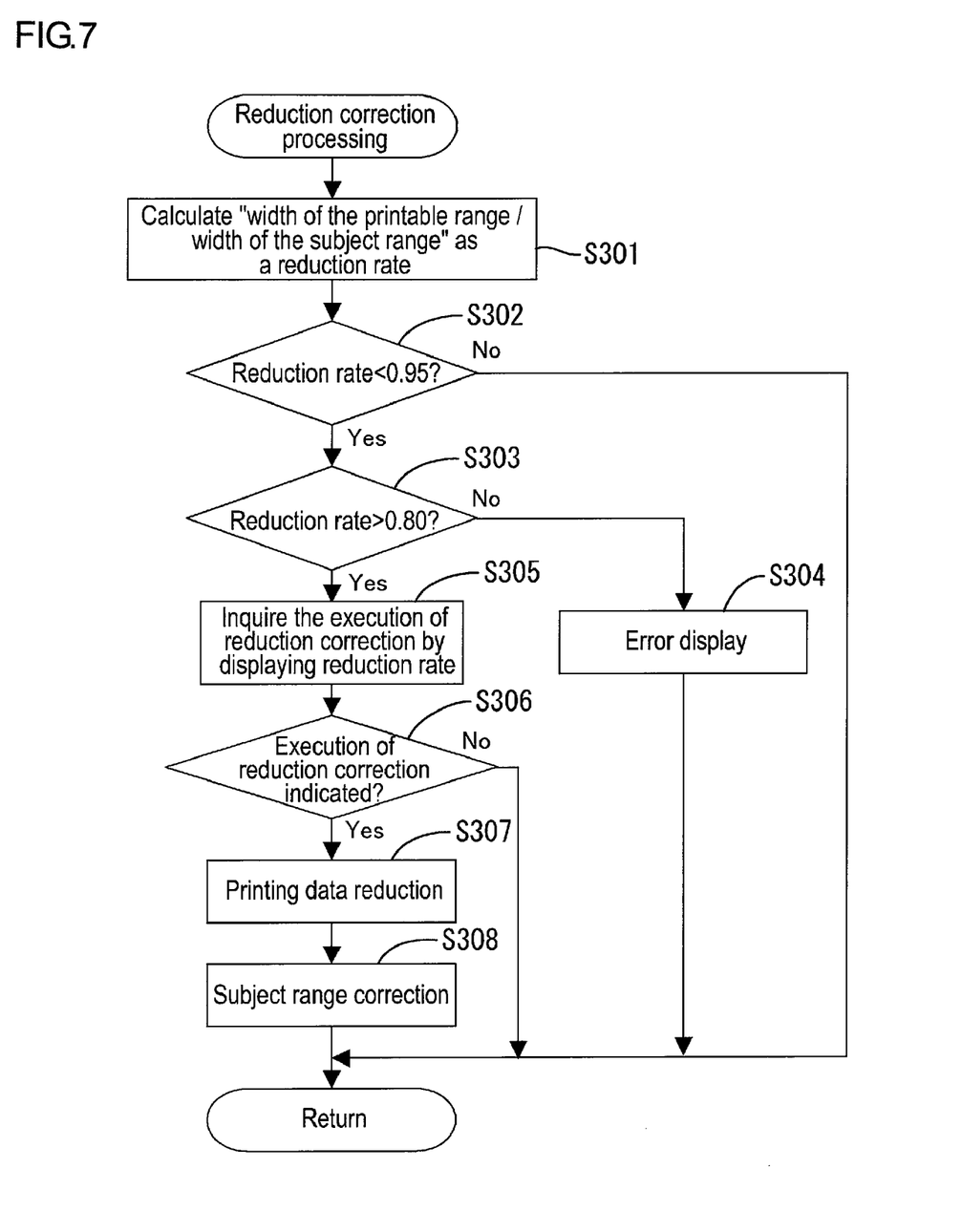
FIG. 7 is a flowchart showing a flow of reduction correction processing.

FIG. 7 is a flow chart showing a flow of reduction correction processing. When beginning the reduction correction processing, the CPU 40 first calculates "width of the printable range/width of the subject range" as a reduction rate (S301). Next, the calculated reduction rate is determined if it is less than 0.95 (S302). When the reduction rate is not less than 0.95 (S302: No) (when the width of the printable range is larger than that of the subject range), or when both the ranges are equal, or when the subject range is larger than the printable range however the difference is slight, the processing ends without conducting reduction correction.

When the reduction rate is less than 0.95 (S302: Yes), it is further determined if it is greater than 0.80 (S303). When the reduction rate is equal to or less than 0.80 (S303: No), an error may be determined, and the process exits this reduction correction processing by sending an error message to the computer 50 so as to display the error message on the display unit 56, or by displaying the error message on the display unit 45 in the printer 1 (S304).

In addition, when the reduction rate is greater than 0.80 (S303: Yes), a signal is transmitted to the computer 50 to display the reduction rate on the display unit 56, or the reduction rate is displayed on the display unit 45 in the printer 1 so that a message encouraging the user to choose whether the reduction correction at the reduction rate is to be conducted can be displayed (S305). When the user inputs an instruction for not conducting the reduction correction from the operating unit 55 in the computer 50 or from the operating unit 46 in the printer 1 (S306: No), the process exits this reduction correction processing without conducting the reduction correction.

When an instruction for conducting the reduction correction is input (S306: Yes), the processing for reducing the image of the printing data of each color in both the main scanning direction and the sub-scanning direction (based on the reduction rate) is conducted (S307). This allows the image of the printing data to be reduced at a rate that equalizes the width of the range set as the subject range (the range defined in a specification or the actual printing range) and the width of the printable range. Next, the value indicating the subject range (the left end position and the width) is corrected to the value reduced in accordance with the above reduction rate using the left end position in the range defined in a specification as a reference (S308), and then the process end the reduction correction processing.

After the reduction correction processing in S106 in FIG. 3, if an error occurs in the reduction correction processing (S107: Yes), the CPU 40 ends this print and correction control processing without executing the printing processing. In addition, when no error has occurred in the reduction correction processing (S107: No), the shift amount calculation processing is conducted (S108).

Shift Amount Calculation Processing

Figure 8:
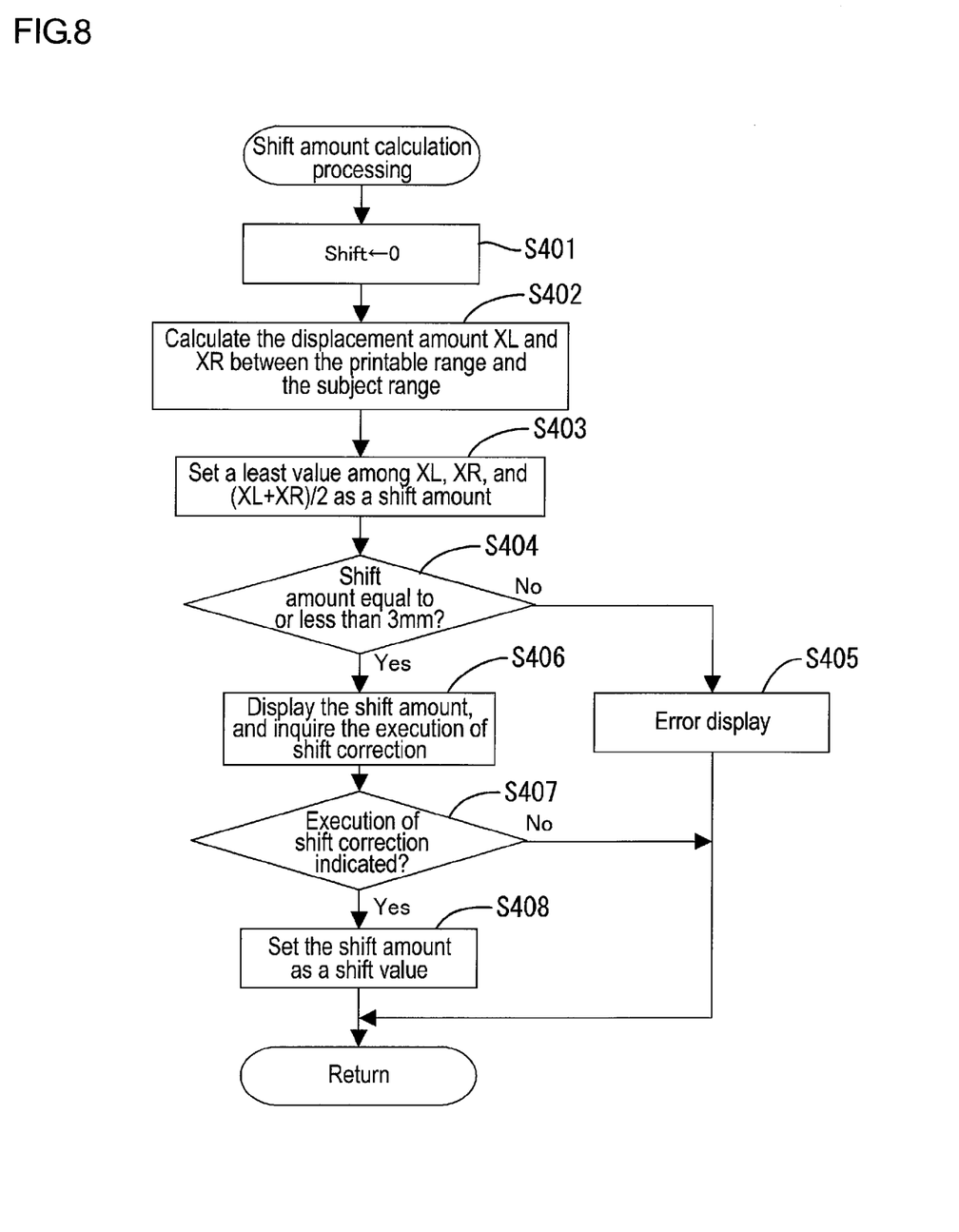
FIG. 8 is a flowchart showing a flow of shift amount calculation processing.
Figure 9:
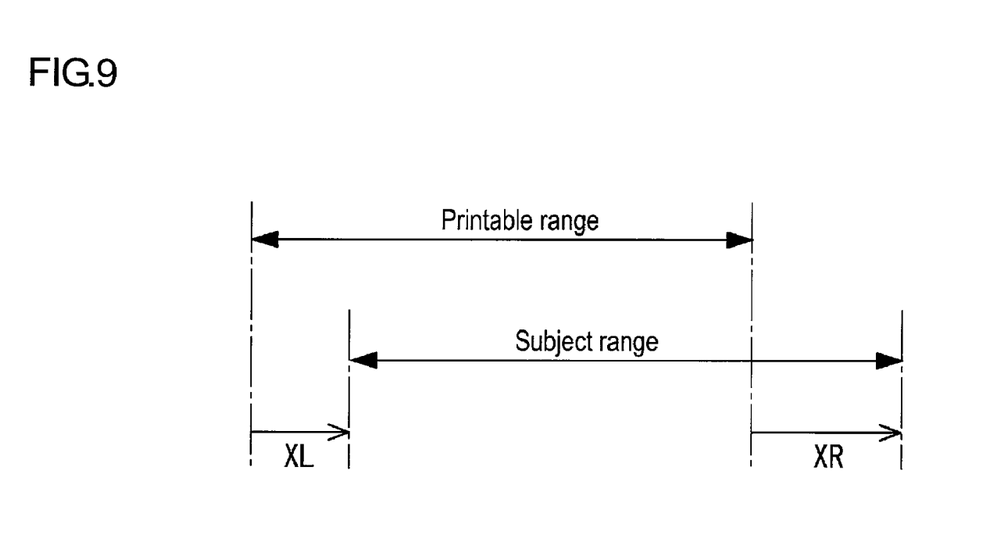
FIG. 9 is a view explaining definitions of parameters employed in shift amount calculation processing.

FIG. 8 is a flowchart showing a flow of shift amount calculation processing, while FIG. 9 is a view explaining definitions of parameters employed in the present processing. The present processing decides a shift amount that is a moving amount at the time of moving the position of the image to be printed.

When the CPU 40 begins the shift amount calculation processing shown in FIG. 8, a shift value as a parameter indicating a shift amount is first set to 0 (S401). Next, displacement amounts XL and XR between the printable range and the subject range are calculated (S402). Here, as shown in FIG. 9, the displacement amount XL is a displacement amount of the left end position in the subject range relative to the left end position in the printable range, while the displacement amount XR is a displacement amount of the right end positions in both the ranges. Additionally, any shift amount and each displacement amount XL and XR are the vector amount regarding the right direction as positive. Next, the one having the least absolute value is chosen from XL, XR, and (XL+XR)/2, and a value having the chosen numeral reversed is set as a shift amount (S403).

In short, for example, when the range defined in a specification is set as a subject range, and when XL is chosen as the least absolute value, the image of the printing data is moved for XL in the later described printing processing, so that the image can be printed with the left end position of the printing data coincided with the left end position in the printable range. In addition, when the actual printing range is set as a subject range, and when XL is chosen as a least absolute value, printing is performed, with the image in the left end position in the actual printing range coincided with the left end position in the printable range. When XR is chosen as a least absolute value, similar to the above, printing is performed, with the right end position in the range defined in a specification or the actual printing range coincided with the right end position in the printable range. And also, when (XL+XR)/2 is chosen as a least absolute value, the image of the printing data is moved so that the central position in the subject range and the central position in the printable range coincide each other. In addition, the shift amount can be controlled to be little since the one having a least absolute value among XL, XR, and (XL+XR)/2 is chosen.

Next, it is determined whether the shift amount (the number of pixels) has a length equal to or longer than 3 mm at the time of printing (S404). When the shift amount is larger than 3 mm (S404: No), an error message is displayed on the display unit 56 in the computer 50 or on the display unit 45 in the printer 1 (S405) due to the excessive shift amount, and the process exits this reduction correction processing.

And also, when the shift amount is equal to or less than 3 mm (S404: Yes), the shift amount is displayed on the display unit 56 in the computer 50 or on the display unit 45 in the printer 1, and a message encouraging the user to choose whether to conduct moving of the image in this shift amount is displayed (S406). When an instruction for not conducting the shift correction is input through the operating unit 55 in the computer 50 or the operation unit 46 in the printer 1 (S407: No), the process exits this shift amount calculation processing with the shift value left as 0. Also, when the user inputs an instruction for conducting the shift correction (S407: Yes), the shift amount value is set as a shift value (S408), and the process then exits this shift amount calculation processing.

When an error occurs in the shift amount calculation processing after the shift amount calculation processing of S108 in FIG. 3 (S109: Yes) is complete, the CPU 40 ends the print and correction control processing without conducting the printing processing. And when no error occurs in the shift amount calculation processing (S109: No), the process proceeds to image cut-off determination processing in below (S110).

Image Cut-Off Determination Processing

Figure 10:
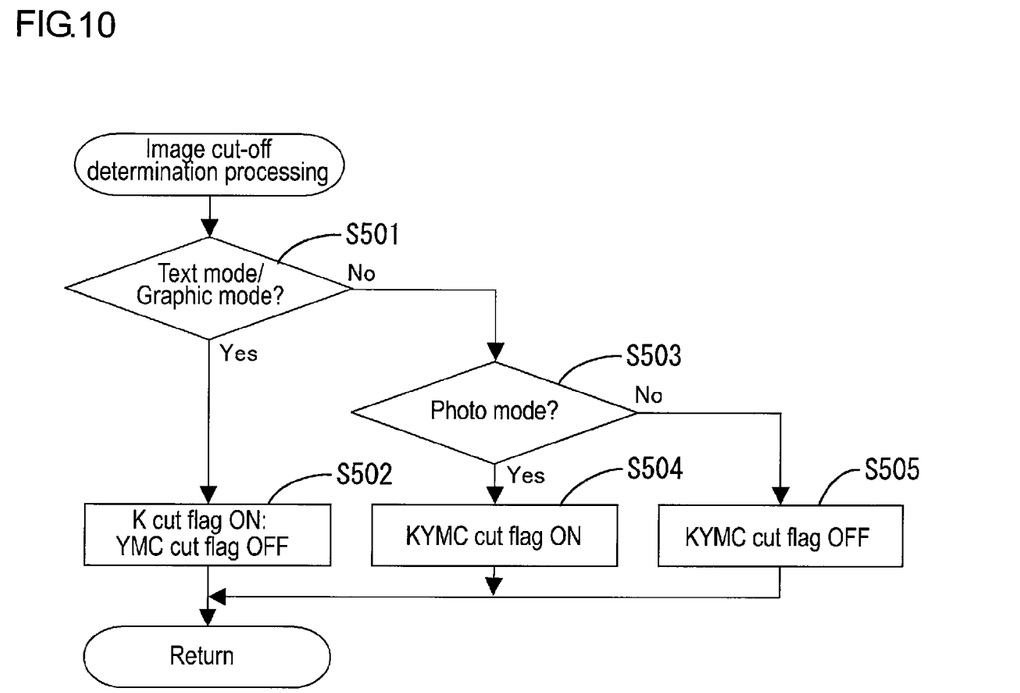
FIG. 10 is a flowchart showing a flow of image cut-off determination processing.

FIG. 10 is a flowchart showing a flow of image cut-off determination processing. As mentioned, since the position of each LED head 19K to 19C is varied, there can be a printable color even in the image outside of the printable range when conducting printing in a plurality of colors. In the present processing, when there is a printable image outside of the printable range, a value of the cut-off flag indicating whether cutting off or printing such image is decided for each color.

As shown in FIG. 10, when the printing order designates the text mode or the graphic mode (S501: Yes), the CPU 40 turns off the cut flag of color K, while turning on the cut flags of other colors. This allows, in the later described printing processing, the image outside of the printable range not to be cut off with respect to the color K (assumed to be used for characters in the text/graphic mode), and thus, image loss causing unreadable characters can be prevented. And also, in the text/graphic mode, the image outside of the printable range with respect to the colors Y, M, and C assumable to be used for figures is cut off, so that the deterioration of appearance caused by printing only some of the colors can be prevented.

In addition, when the printing order designates the photo mode, (S501: No, S503: Yes), the cut flags of all colors are turned on (S504). This prevents a state where some of the colors are not printed in the left end part or the right end part of a photo to be printed. In addition, when the printing order does not designate the photo mode, (S503: No), in short, when none of the aforementioned three modes is designated, all the cut flags are turned off (S505) Therefore, in such a case, when there is image printable by each the LED head 19K to 19C outside of the printable range, such an image is printed. After setting the cut flag for each color, the process exits this image cut-off determination processing.

The CPU 40, after exiting the image cut-off determination processing in S110 in FIG. 3, executes the printing processing (S111). In the printing processing, each pixel data of each color in the printing data is read out sequentially from the left end position by a line, and the pixel data is sequentially transmitted to each LED unit 18K to 18C in the exposure unit 18. In this moment, the displacement of position between each LED head 19K to 19C is compensated by adding margin data in accordance with the displacement amount to the beginning of data to be transmitted to LED heads 19 to 19C. And also, when a value other than 0 is set as the shift amount, a printing position of the image is moved by displacing a starting position for reading out of printing data in accordance with the value. For each color, when the cut flag is set ON, the image printing is conducted only within the printable range, deleting the image outside of the printable range as mentioned above. When the cut flag is set OFF, and when there is an image printable by each LED head 19K to 19C outside of the printable range, such an image is printed.

According to the present aspect of the invention, when a printable range specific to each LED head 19K to 19C is obtained, and when an image based on the printing data is determined as not settling within the printable range, the position or size of the image to be formed is adjusted in accordance with the printable range. This allows the prevention or control of disadvantage caused by image loss, without setting a sufficiently large structural printable range compared with the maximum printable range defined in a specification.

As a configuration for obtaining a printable range, for example, a printable range may be measured by an external instrument at the time of manufacturing an image forming apparatus, and the result may be recorded in a memory inside of the apparatus, so that the data in the memory may be referred at the time of obtaining the range. However, such configuration cannot respond to a change of the printable range due to such as, for example, an environmental change, while on the other hand, the present aspect of invention can respond to a change of the printable range since being provided with means for measuring the printable range.

In addition, the each LED head 19K to 19C measures a position of the mark formed on the belt 13, so as to obtain a printable range from the measured result. This enables a printable range to be measured easily by using a conventional configuration.

Also, when conducting image formation by overlapping a plurality of colors, the position and size adjustment of images is performed based on a range, that can be formed by overlapping a plurality of images using a plurality of LED heads 19K to 19C, as a printable range. This allows preventing a partial color loss in a formed image due to such as displacement between assembling positions of LED heads 19K to 19C.

And also, the larger number of LED heads tends to cause a smaller printable range, resulting in a higher adjustment degree of images, however, according to the present aspect of the invention, a printable range only for each LED head 19K to 19C, that is used for actual image formation, is obtained, so that the influence from such tendency can be reduced.

In addition, a printable range is set as an image-formable range with respect only to a part of a plurality of LED heads 19K to 10C, and thus, the tendency that the image adjustment degree becomes higher due to a smaller printable range can be restrained. For example, when printing a general document, a loss of characters can be surely prevented, when a range, that is capable of image formation for color K of frequent use for characters, is set as a printable range. In such a case, it is understood that the trouble is less even when a partial loss is occurred in an image of other colors such as color Y.

When conducting image formation by a plurality of LED heads 19K to 19C, the printable ranges for each LED head 19K to 19C are varied, and there is a case where the image formation can be performed even in the outside of the printable range with respect to a part of colors. In such a case, the appearance may be deteriorated when an image of part of colors are formed outside of the printable range, however, to cut off the image outside of the printable range enables the deterioration of appearance to be restrained.

Also, when adjusting the image position, the appearance can be assured for a certain level depending on contents of an image, even when for example a part of the image to be printed is absent, by coinciding the right end position, the left end position, or the center position in the image respectively with the right end position, left end position, or the center position in the printable range.

Also, when an image based on the printing data does not fit within the printable range, the user is informed thereof, so as to choose whether or not to conduct image adjustment.

In addition, when adjusting an image size, the image is reduced so that the entire image based on the printing data fits within the printable range, and thus, the original image can be formed without a loss, with its appearance assured.

In addition, the apparatus of a type employing LEDs as an exposing device tends to be designed to have a large printable range, resulting in a large apparatus size and a higher cost. In this respect, too, the present invention can obtain a great effect.

Other Aspects of the Invention

The present invention is not limited to the aspects described in the above with reference to the accompanying figures, and, for example, the following can also be included in the technical scope of the present invention.

(1) In the above aspect, examples are shown in which the present invention is applied to an electrophotographic system LED printer, however, the present invention can also be applied to other image forming apparatuses such as a laser printer or an ink-jet printer.

(2) In the above aspect, an image forming apparatus of a direct transfer system is shown, however, the present invention may be applied to an image forming apparatus employing an intermediate transfer body, such as an intermediate transfer belt and an intermediate transfer drum. In this case, when measuring a positional displacement of forming device, a mark may be formed on the intermediate transfer body for the measurement.

(3) In the above aspect, an image forming system according to the present invention is composed only of an image forming apparatus, however, it may be composed of an image forming apparatus and a computer connected thereto. For example, image formation may be conducted in a manner, that a CPU in the computer obtains an image forming range of a forming device recorded in a memory in an image forming apparatus, determines whether the printing data fits within the image forming range, performs image adjustment of the printing data when the printing data is determined not to fit within, and then transmits the adjusted printing data to the image forming apparatus.

(4) A pattern formed on a belt (supporting member) may be read out by a pattern detection sensor, so that the correction of positional displacement due to such as variation of belt speed or the correction of printing density can be performed. This keeps control of the cost since making parts common.

(5) In the above aspect, such as a position of an image is adjusted in a software way, however, according to the present invention, such as a position of an image can also be adjusted mechanically, by changing the orientation of a lens in an exposing device or displacing a delivery position of a recording medium relative to a forming device in the width direction.

What is claimed is:

1. An image forming system comprising:
a forming device for forming an image based on printing data,
an obtaining device for obtaining an image-formable range specific to the forming device,
a determination circuit for determining if the image based on printing data fits within the image-formable range, and
an adjusting circuit for adjusting at least one of a position and a size of the image in accordance with the image-formable range, when the determination circuit determines that the image does not fit within the image-formable range, wherein a plurality of the forming device are provided so that an image is formed by overlapping images of each of the plurality of forming device, and the obtaining device obtains a range formed by overlapping images of a plurality of the forming device, as the image-formable range.

2. The image forming system according to claim 1, wherein the obtaining device conducts measurement of an image-formable range of the forming device.

3. The image forming system according to claim 2, comprising a supporting member for supporting a recording medium, wherein the obtaining device measures a position of am ark formed on the supporting member by the forming device, and obtains an image-formable range from a measured result.

4. The image forming system according to claim 1, wherein the obtaining device obtains a range formed by overlapping an image of only the forming device that is to be used for image formation of the printing data among a plurality of the forming device, as the image-formable range.

5. The image forming system according to claim 1, wherein a plurality of the forming device is provided so that an image is formed by overlapping images of each of the forming device, and the obtaining device obtains a range capable of forming images with respect to only a part of a plurality of the forming device, as the image-formable range.

6. The image forming system according to claim 1, wherein the adjusting circuit deletes an image outside of the image-formable range in the image based on printing data.

7. The image forming system according to claim 1, wherein the adjusting circuit adjusts a position of an image, so that one end position of the image based on printing data coincides with one end position of the image-formable range, or so that a center position in the image based on printing data coincides with a center position in the image-formable range.

8. The image forming system according to claim 1, comprising: a display for informing that the image does not fit within the image-formable range when the determination circuit determines that the image does not fit within the image-formable range, and
    an input unit for receiving a choice whether to conduct adjustment by the adjusting circuit.

9. The image forming system according to claim 1, wherein the adjusting circuit reduces an entire image so that the image based on printing data fits within the image-formable range.

10. The image forming system according to claim 1, wherein the forming device comprises a photoreceptor, and an exposing device for exposing the photoreceptor by a plurality of LEDs aligned in a line.

11. An image forming system comprising:
    a forming device for forming an image based on printing data,
    a processing unit;
    memory having machine readable instructions stored thereon that, when executed by the processing unit, cause the processing unit to function as:
    an obtaining device for obtaining an image-formable range specific to the forming device,
    a determination circuit for determining if the image based on printing data fits within the image-formable range, and
    an adjusting circuit for adjusting at least one of a position and a size of the image in accordance with the image-formable range, when the determination circuit determines that the image does not fit within the image-formable range.
    wherein a plurality of the forming device are provided so that an image is formed by overlapping images of each of the plurality of forming device, and the obtaining device obtains a range formed by overlapping images of a plurality of the forming device, as the image-formable range.

12. The image forming system according to claim 11, wherein the obtaining device conducts measurement of an image-formable range of the forming device.

13. The image forming system according to claim 12, comprising a supporting member for supporting a recording medium, wherein the obtaining device measures a position of am ark formed on the supporting member by the forming device, and obtains an image-formable range from a measured result.

14. The image forming system according to claim 11, wherein the obtaining device obtains a range formed by overlapping an image of only the forming device that is to be used for image formation of the printing data among a plurality of the forming device, as the image-formable range.

15. The image forming system according to claim 11, wherein a plurality of the forming device are provided so that an image is formed by overlapping images of each of the plurality of forming device, and the obtaining device obtains a range formed by overlapping images of a plurality of the forming device, as the image-formable range.

16. The image forming system according to claim 11, wherein the adjusting circuit deletes an image outside of the image-formable range in the image based on printing data.

17. The image forming system according to claim 1, wherein the adjusting circuit adjusts a position of an image, so that one end position of the image based on printing data coincides with one end position of the image-formable range, or so that a center position in the image based on printing data coincides with a center position in the image-formable range.

18. The image forming system according to claim 11, comprising:
    A display for informing that the image does not fit within the image-formable range when the determination circuit determines that the image does not fit within the image-formable range, and
    a input unit for receiving a choice whether to conduct adjustment by the adjusting circuit.

19. The image forming system according to claim 1, wherein the adjusting circuit reduces an entire image so that the image based on printing data fits within the image-formable range.

20. The image forming system according to claim 11, wherein the forming device comprises a photoreceptor, and an exposing device for exposing the photoreceptor by a plurality of LEDs aligned in a line.

* * * * *

UNITED STATES PATENT AND TRADEMARK OFFICE
CERTIFICATE OF CORRECTION

PATENT NO.        : 8,041,274 B2
APPLICATION NO.   : 12/359562
DATED             : October 18, 2011
INVENTOR(S)       : Kazuma Aoki

Page 1 of 1

It is certified that error appears in the above-identified patent and that said Letters Patent is hereby corrected as shown below:

Column 12, Claim 3, Line 63:
Please delete "am ark" and insert -- a mark --

Column 14, Claim 13, Line 11:
Please delete "am ark" and insert -- a mark --

Signed and Sealed this
Third Day of July, 2012

David J. Kappos
*Director of the United States Patent and Trademark Office*